United States Patent
Sinclair et al.

(10) Patent No.: US 9,356,787 B2
(45) Date of Patent: May 31, 2016

(54) SECURE COMMUNICATION ARCHITECTURE INCLUDING SNIFFER

(71) Applicants: Peter Sinclair, Atherton, CA (US); James Lloyd, San Francisco, CA (US); Michael Eynon, Woodside, CA (US)

(72) Inventors: Peter Sinclair, Atherton, CA (US); James Lloyd, San Francisco, CA (US); Michael Eynon, Woodside, CA (US)

(73) Assignee: Truedata Systems, Inc., Atherton, CA (US)

( * ) Notice: Subject to any disclaimer, the term of this patent is extended or adjusted under 35 U.S.C. 154(b) by 3 days.

(21) Appl. No.: 14/055,842

(22) Filed: Oct. 16, 2013

(65) Prior Publication Data

US 2014/0108791 A1 Apr. 17, 2014

Related U.S. Application Data

(63) Continuation of application No. PCT/US2013/065323, filed on Oct. 16, 2013, and a continuation of application No. 14/055,706, filed on Oct. 16, 2013.

(60) Provisional application No. 61/714,629, filed on Oct. 16, 2012, provisional application No. 61/841,671, filed on Jul. 1, 2013, provisional application No. 61/867,293, filed on Aug. 19, 2013.

(51) Int. Cl.
| | |
|---|---|
| *G06F 21/00* | (2013.01) |
| *H04L 9/32* | (2006.01) |
| *G06F 21/60* | (2013.01) |
| *G09C 1/00* | (2006.01) |
| *H04L 29/06* | (2006.01) |
| *H04L 9/30* | (2006.01) |

(52) U.S. Cl.
CPC ............ *H04L 9/3247* (2013.01); *G06F 21/602* (2013.01); *G09C 1/00* (2013.01); *H04L 63/0823* (2013.01); *H04L 9/30* (2013.01); *H04L 2209/127* (2013.01)

(58) Field of Classification Search
CPC .................................................. H04L 63/0823
USPC .......................................................... 713/164
See application file for complete search history.

(56) References Cited

U.S. PATENT DOCUMENTS 8,087,083 B1 * 12/2011 Norris .............................. 726/24
2002/0171856 A1 * 11/2002 Ackerman et al. ........... 358/1.13

(Continued)

OTHER PUBLICATIONS

PCT/US13/65323 International Search Report and Written Opinion issued May 7, 2014.

(Continued)

*Primary Examiner* — Morshed Mehedi
(74) *Attorney, Agent, or Firm* — Peters Verny, LLP

(57) ABSTRACT

Secure communication of user inputs is achieved by isolating part of an endpoint device such that certificates and encryption keys are protected from corruption by malware. Further, the communication is passed through a trusted data relay that is configured to decrypt and/or certify the user inputs encrypted by the isolated part of the endpoint device. The trusted data relay can determine that the user inputs were encrypted or certified by the protected certificates and encryption keys, thus authenticating their origin within the endpoint device. The trusted data relay then forwards the inputs to an intended destination. In some embodiments, the isolated part of the endpoint device is configured to detect input created by auto-completion logic and/or spell checking logic.

27 Claims, 5 Drawing Sheets

(56) References Cited

U.S. PATENT DOCUMENTS

| | | |
|---|---|---|
| 2004/0003262 A1* | 1/2004 | England et al. ............... 713/189 |
| 2005/0138433 A1* | 6/2005 | Linetsky ........................ 713/202 |
| 2005/0180341 A1* | 8/2005 | Nelson et al. ................. 370/260 |
| 2008/0040259 A1* | 2/2008 | Snow et al. ..................... 705/38 |
| 2011/0117895 A1 | 5/2011 | Robertson et al. |
| 2011/0321139 A1* | 12/2011 | Jayaraman et al. ............... 726/4 |
| 2012/0079282 A1* | 3/2012 | Lowenstein et al. .......... 713/189 |
| 2012/0174233 A1* | 7/2012 | Waterson ........................ 726/26 |
| 2012/0221938 A1 | 8/2012 | Patterson et al. |

OTHER PUBLICATIONS

PCT/US13/65323, Search Report and Written Opinion, Mailed May 7, 2014.
Video, Wikipedia, http://en.wikipedia.org/wiki/Video, Nov. 14, 2014, 11 pages.
U.S. Appl. No. 14/055,706, Office Action dated Mar. 19, 2015.
U.S. Appl. No. 14/055,861, Office Action dated Jan. 26, 2015.
U.S. Appl. No. 14/055,861, Amendment a filed Apr. 27, 2015.
U.S. Appl. No. 14/055,868, Office Action dated May 5, 2015.

* cited by examiner

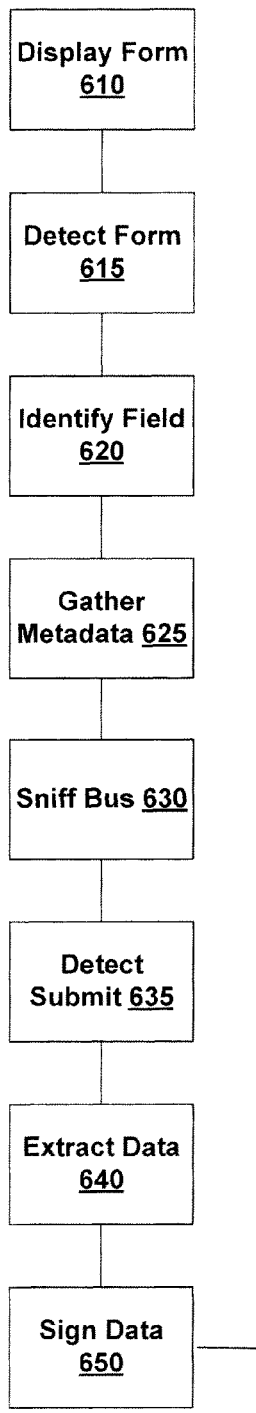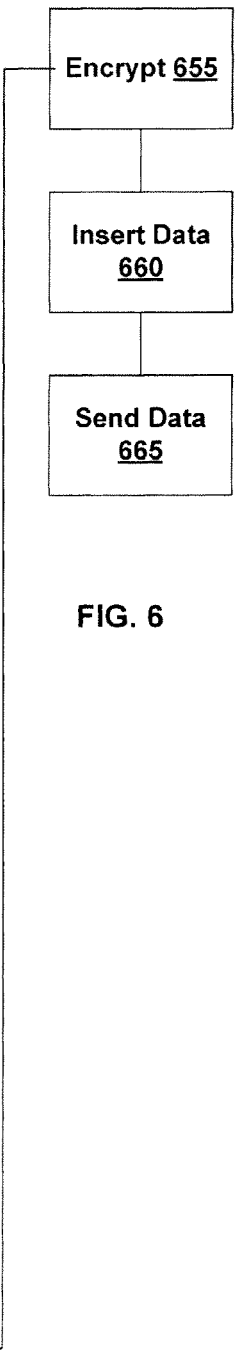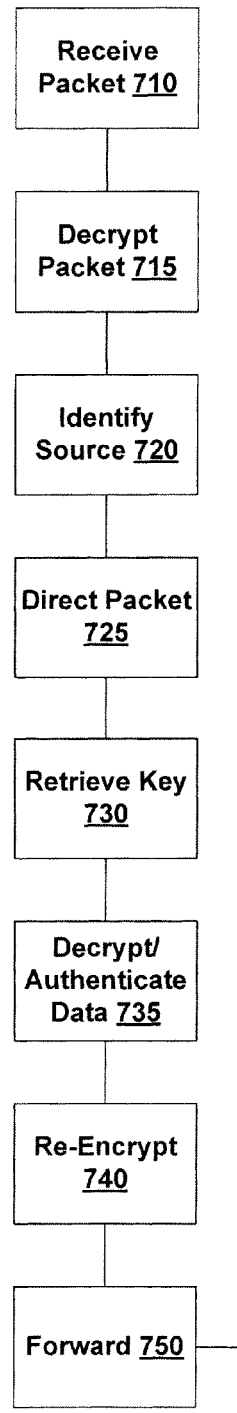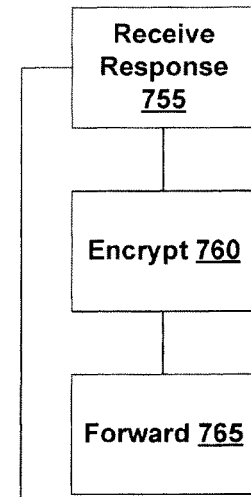
FIG. 6
FIG. 7

SECURE COMMUNICATION ARCHITECTURE INCLUDING SNIFFER

CROSS-REFERENCE TO RELATED APPLICATION

This application claim benefit of and priority to provisional patent applications Ser. No. 61/714,629 filed Oct. 16, 2012; Ser. No. 61/841,671 filed Jul. 1, 2013 and 61/867,293 filed Aug. 19, 2013; this application is a continuation of PCT patent application Ser. No. PCT/US13/65323; and this application is a continuation of U.S. non-provisional patent application Ser. No. 14/055,706. The above patent applications are hereby incorporated herein by reference.

BACKGROUND

1. Field of the Invention

The invention is in the field of communication security.

2. Related Art

Computer security has become more difficult since the rise of the internet. Threats include financial fraud, information theft and espionage. Once on a computing system, malware can operate in stealth, monitoring and stealing passwords and security information. Such malware is not only found on traditional computer systems, but also mobile devices such as cell phones and tablets.

SUMMARY

The security of a computing device is enhanced by logically isolating a part of the device such that cannot be corrupted by malware, and using the isolated part to encrypt and/or certify user inputs. In some embodiments, the isolated part functions as a bridge between a user input device and the rest of the computing device. The bridge can receive inputs directly from the user input device or can monitor the flow of data within the computing device to detect inputs.

In some embodiments the bridge is configured to encrypt user input using a protected key. The encrypted input is sent to an external trusted data relay where it is decrypted and relayed to a third party destination. The key may be a public key or a key that is protected by the physical architecture of the computing device. For example, the computing device is optionally configured such that the contents (logic and keys, etc.) of the bridge can only be accessed or modified once. In some embodiments, an encryption key installed by the manufacturer or distributor of the computing device cannot be changed or read outside of the bridge. As such, malware on the computing device cannot corrupt the functions of the bridge or use the correct key to encrypt data outside of the bridge.

In some embodiments the bridge is configured to certify user input using a certificate. The certificate is used to digitally sign the user input such that any modification of the user input is easily detected. The certified input is sent to a trusted data relay where it is authenticated (e.g., verified) and relayed to a third party destination. The certificate is optionally protected by the physical architecture of the computing device. For example, the computing device may be configured such that the contents (logic, certificates and keys, etc.) of the bridge can only be accessed or modified once. Optionally, a certificate installed by the manufacturer or distributor of the computing device cannot be changed or read outside of the bridge. As such, malware on the computing device cannot corrupt the functions of the bridge.

The trusted data relay is configured to decrypt and/or authenticate received input data. This process serves to assure the input data as coming from the computing device and has not been corrupted on the computing device. The decrypted and/or authenticated data is then forwarded to a third party destination such as an online store or financial institution. The trusted data relay is configured to store decryption keys, validation keys, computing device identifiers, user account information, and the like, for a plurality of computing devices and accounts. For each computing device there may be several accounts approved for access by that device.

Various embodiments of the invention include a computing system comprising an input apparatus configured to receive an input from a user; a display configured to display the input; a bus configured to communicate the input to the display; a processing unit configured to process data and commands received via the bus; an input capture module isolated from a less secure part of the computing system, the isolation configured to prevent corruption of the input capture module by computing instructions received from outside of the input capture module, the input capture module comprising: storage configured to store an encryption key or certificate such that the encryption key or certificate cannot be read from outside the input capture module, a data input configured to receive data resulting from the input apparatus the input module optionally being disposed between the input apparatus and the less secure part of the computing system such that input at the input apparatus goes through the capture module prior to being received by the less secure part, and logic configured to encrypt or certify the data resulting from the input apparatus, the encryption or certification using the encryption key or certificate and occurring within the input capture module; and communication logic configured to communicate an output of the logic to a communication network.

Various embodiments of the invention include a computing system comprising: an input apparatus configured to receive an input from a user; a display configured to display the input; a processing unit configured to process commands received from the user; an input capture module isolated from a less secure part of the computing system, the isolation configured to prevent corruption of the input capture module by computing instructions from outside of the input capture module, the input capture module comprising: storage configured to store a plurality of encryption keys and/or certificates, means for capturing data from the less secure part of the computing system, a flag input configured to select from among the plurality of encryption keys and/ or certificates, and logic configured to encrypt or certify the captured data, the encryption or certification using the selected encryption key or certificate and occurring within the input capture module; and communication logic configured to communicate the encrypted or certified data to a communication network.

Various embodiments of the invention include an endpoint system comprising: an input apparatus configured to receive input from a user and including an input buffer, the input buffer being configured to store the received input; a processor configured to receive input via the input apparatus and to execute software applications on the endpoint system; a bus configured to communicate the input from the input buffer to a storage accessible to the processor; and a sniffer configured to detect the input as it is communicated on the bus from the input buffer, the input as detected by the sniffer being unalterable by the processor prior to the detection.

Various embodiments of the invention include an endpoint system comprising: an input apparatus configured to receive input from a user and including an input buffer, the input buffer being configured to store the received input; a processor configured to receive user input via the input apparatus; a bus configured to communicate the input from the input buffer to a storage accessible to the processor; and a capture module configured to detect the input such that the input detected is assured to be a true copy of the input as received from the user.

Various embodiments of the invention include a computing system comprising: an input apparatus configured to receive an input from a user; a display configured to display the input from the user; a bus configured to communicate the input to the display; a processing unit configured to process data and commands received via the bus; an input capture module isolated from a less secure part of the computing system, the isolation configured to prevent corruption of the input capture module by computing instructions received from outside of the input capture module, the input capture module comprising: storage configured to store an encryption key or certificate, a sniffer configured to sniff the bus for input data resulting from the input from the user, and logic configured to encrypt or certify the input data, the encryption or certification occurring within the input capture module; and communication logic configured to communicate an output of the input capture module to a communication network.

Various embodiments of the invention include a computing system comprising: an input apparatus configured to receive an input from a user; a display configured to display the input from the user; a bus configured to communicate the input to the display; a processing unit configured to process the input; an input capture module isolated from a less secure part of the computing system, the isolation configured to prevent corruption of the input capture module by computing instructions received from outside of the input capture module, the input capture module comprising: storage configured to store an encryption key or a certificate, a sniffer configured to sniff the bus for video data, character recognition logic configured to identify input data within the video data, the input data resulting from the input from the user, and logic configured to encrypt or certify the input data identified by the character recognition logic; and communication logic configured to communicate an output of the logic to a communication network.

Various embodiments of the invention include an endpoint system comprising: an input apparatus configured to receive input from a user and including an input buffer, the input buffer being configured to store the received input; a processor configured to receive the input via the input apparatus; a bus configured to communicate the input from the input buffer to a storage accessible to the processor; and a sniffer configured to detect the input as it is communicated on the bus from the input buffer to the storage, the detection occurring prior to the input being modifiable by the processor.

Various embodiments of the invention include a secure communication system comprising: an input configured to receive at least partially encrypted data from an endpoint system, the at least partially encrypted data including an identifier of the endpoint system; a key storage including decryption keys stored in association with device identifiers; decryption/authentication logic configured to decrypt the at least partially encrypted data to a decrypted output, using a decryption key retrieved from the key storage, the retrieval using the identifier of the endpoint system; a remote service connector configured to forward the decrypted input to a remote computing system, and to receive a communication from the remote computing system, the received communication being in response to the forwarded decrypted output; and an endpoint connector configured to forward the received communication from the remote computing system to a less secure part of the endpoint system.

Various embodiments of the invention include a secure communication system comprising: a first I/O configured to receive at least partially encrypted or at least partially certified data from a secure portion of a computing system, the at least partially encrypted or certified data including an identifier of the computing device and including a user input to the computing system; a storage including decryption keys or certification data stored in association with device identifiers; encryption/authentication logic configured to decrypt or authenticate the at least partially encrypted or certified data using a decryption key or certification data retrieved from the storage, the retrieval using the identifier of the computing system; and a second I/O configured to forward the decrypted input to a remote computing system.

Various embodiments of the invention include a method of communicating secure data, the method comprising: displaying a video image on a display device; detecting a form within the video image, the form including one or more data entry fields; identifying a member of the one or more data entry fields having a current focus; gathering metadata characterizing the identified member of the one or more data entry fields; sniffing a bus to capture data entered in the identified member of the one or more data entry fields; encrypting the captured data or digitally signing the captured data; inserting the encrypted or signed data in a data packet; and sending the encrypted or signed data to a remote device via a communication network.

Various embodiments of the invention include a method of forwarding secure data, the method comprising: receiving a data packet from an endpoint system; identifying a source of the data packet; retrieving a decryption key or certification data based on the identity of the source; decrypting or authenticating contents of the data packet; identifying an account based on the identity of the source; identifying a destination for the contents; and forwarding the contents to the destination based on a status of the account.

Various embodiments of the invention include a computing system comprising: a secure input apparatus including an input apparatus configured to digitize an input from a user, the secure input apparatus further including a secure key storage configured to store an encryption key and encryption logic configured to encrypt the digitized input using the encryption key; a less secure portion of the computing system, the less secure portion being configured to receive the receive the encrypted input and to communicate the encrypted input to a TDR server, and being configured to function as an endpoint to communications received from the TDR server; and a communication circuit configured to communicate the encrypted input from the secure input to the less secure portion.

Various embodiments of the invention include a computing system comprising: a secure input apparatus including an input apparatus configured to digitize an input from a user; a secure key storage configured to store an encryption key; encryption logic configured to encrypt the digitized input using the encryption key; and a less secure portion of the computing system, the less secure portion being configured to receive the encrypted input and to communicate the encrypted input to a TDR server, and being configured to function as an endpoint to communications received from the TDR server, the encryption logic being disposed in a communication circuit between the secure input apparatus and the less secure portion.

BRIEF DESCRIPTION OF THE DRAWINGS

FIG. 6 illustrates methods of transferring secure data, according to various embodiments of the invention.

FIG. 7 illustrates methods of receiving and forwarding secure data, according to various embodiments of the invention.

DETAILED DESCRIPTION

Systems and methods of the invention may be used, for example, to secure interactions between computing devices and internet based services. The interactions can include financial transactions such as accessing a bank account, making a purchase, or bidding. The interactions can also include accessing confidential information such as medical data, web based e-mail, social networking accounts, etc. Not only are interactions secured, but in some embodiments authentication of a user's computing devices serves to supplement and/or replace login steps.

Figure 1:
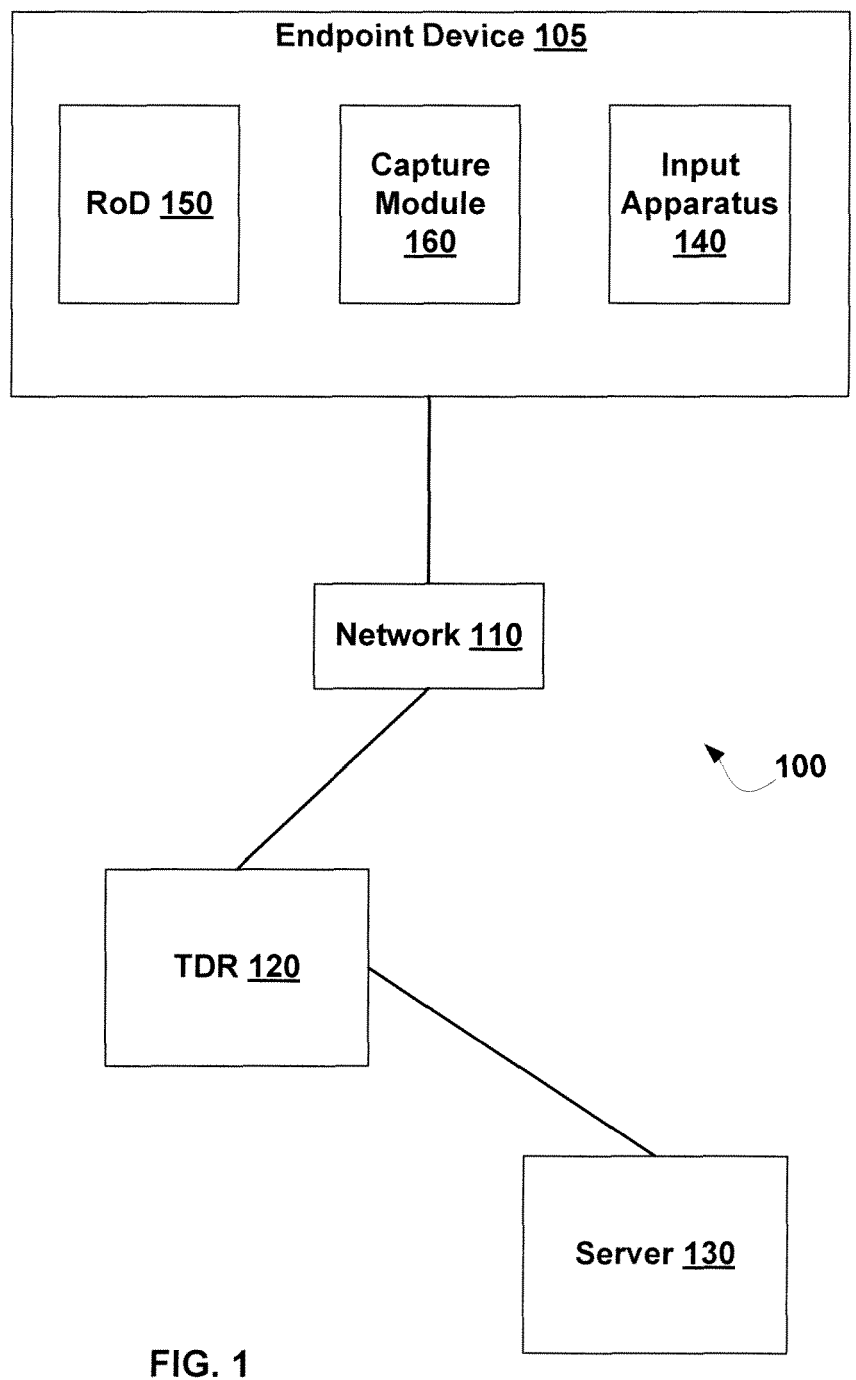
FIG. 1 illustrates a secure communication system, according to various embodiments of the invention.

FIG. 1 illustrates a Secure Communication System 100, according to various embodiments of the invention. Secure Communication System 100 includes an Endpoint Device 105, a Network 110, a Trusted Data Relay (TDR) 120 and a Server 130. Endpoint Device 105 is a computing device or system configured to operate as final destination and initial source of data packets in network communications. Endpoint Device 105 can be a mobile device, a smart phone, a tablet computer, a laptop computer, a desktop computer, and or the like. Network 110 is a computer network, such as the Internet, over which data packets are communicated using destination addresses such as MAC or IP addresses. Systems discussed herein may include a device within a single housing or alternatively a plurality of connected parts in different enclosures that make up the system. For example, the components of Endpoint Device 105 may all be including in a cellular telephone or tablet computer having a single housing (e.g., case).

Endpoint Device 105 includes at least an Input Apparatus 140, a Capture Module 160 and what is referred to herein as the Rest of Device (RoD) 150. Input Apparatus 140 includes a physical apparatus configured to provide input to Endpoint Device 100. For example, Input Apparatus 140 can include a keyboard, a pointing device (mouse, touch pad, etc.), a camera, a biometric device (finger print or eye scanner, etc.), a global positioning system, a local positioning system, a touch screen, voice-to-text logic, a measurement device, and/or the like. In some embodiments, Input Apparatus 140 includes an audio input and voice-to-text logic. RoD 150, Input Apparatus 140 and/or Capture Module 160 are optionally disposed within a same housing.

Capture Module 160 is configured to detect inputs generated using Input Apparatus 140. In some embodiments Capture Module 160 is disposed between Input Apparatus 140 and RoD 150. For example, Capture Module 160 can be a dongle placed between a keyboard and a computer. In this example, all keystrokes entered at the keyboard pass through Capture Module 160 before being received by RoD 150. Capture Module 160 may prevent malware from reaching logic within the keyboard by blocking communications from RoD 150 to the keyboard. Capture Module 160 may be referred to as a bridge.

In some embodiments, Capture Module 160 is not disposed between Input Apparatus 140 and RoD 150. Rather, Capture Module 160 is configured to monitor communications within Endpoint Device 105. As is described further elsewhere herein, these communications may be between Input Apparatus 140 and RoD 150, and/or between various parts of RoD 150. For example, in some embodiments, Capture Module 160 is configured to sniff a (data) bus within Endpoint Device 105. As used herein, the term sniffing a bus is meant to include monitoring a data bus for data communicated within the bus, the data being destined for an element other than the sniffer. Typically, sniffing is a one way communication. The bus sniffed can be a main system bus, a video bus, and/or the like.

RoD (Rest of Device) 150 is meant to include those parts of Endpoint Device 105 other than Capture Module 160 and Input Apparatus 140. As discussed elsewhere herein, RoD 150 can include a wide variety of components such as a microprocessor, a bus and a display. RoD 150 is a less secure part of the computing device relative to Capture Module 160.

TDR 120 includes one or more servers configured to receive data packets from Endpoint Device 105. As is described further elsewhere herein, TDR 120 is configured to decrypt and/or certify user input within the data packets, and forward the user input to a final destination, such as Server 130. TDR 120 is optionally also configured to receive responses from Server 130 and communicate these response to Endpoint Device 105. In some embodiments the data packets receive from Endpoint Device 105 are communicated from Endpoint Device 105 to TDR 120 directly via Network 110. In some embodiments, the data packets are communicated from Endpoint Device 105 to Server 130, where they are recognized as requiring decryption and/or verification by TDR 120. In these embodiments, Server 130 forwards the data packets to TDR 120, where they are decrypted and/or verified and then returned to Server 130. This approach does not require communication directly from Endpoint Device 105 to TDR 120.

Server 130 is one or more computing device configured to provide a service. For example, Server 130 may be a server of a private corporate network, a financial institution, an auction site, a medical data server, an e-mail server, video or audio streamer, a social networking website, and/or the like. Server 130 is optionally managed by a different entity than TDR 120. Server 130 optionally includes a gatekeeper configured to control access to a protected network. In some embodiments, Server 130 is configured to communicate with Endpoint Device 105 via TDR 120 for the purposes of authentication and administration of a security policy. Following satisfaction of the security policy Server 130 may then allow direct access from Endpoint Device 105 to a network protected by Server 130. Access may be allowed by setting an access control list, assigning a VLAN, etc. Embodiments in which this approach may be taken include, for example, logging into Servers 130 configured to stream files, music or video; or logging into Servers 130 configured to setup voice or video calls.

In some embodiments Server 130 is configured to treat user input received from other external clients in the same way it treats user input received from TDR 120. However, in other embodiments, Server 130 is configured to allow greater access privileges if Server 130 is accessed via TDR 120 relative to if Server 130 is accessed from some other client. For example, access via TDR 120 may be required to transfer funds.

TDR 120 and Server 130 may communicate through Network 110 and/or via a private communication channel (as illustrated). Typically TDR 120 is configured to communicate with a large number of Endpoint Devices 105 and/or Servers 130. TDR 120 can include a plurality of distributed computing devices.

Figure 2:
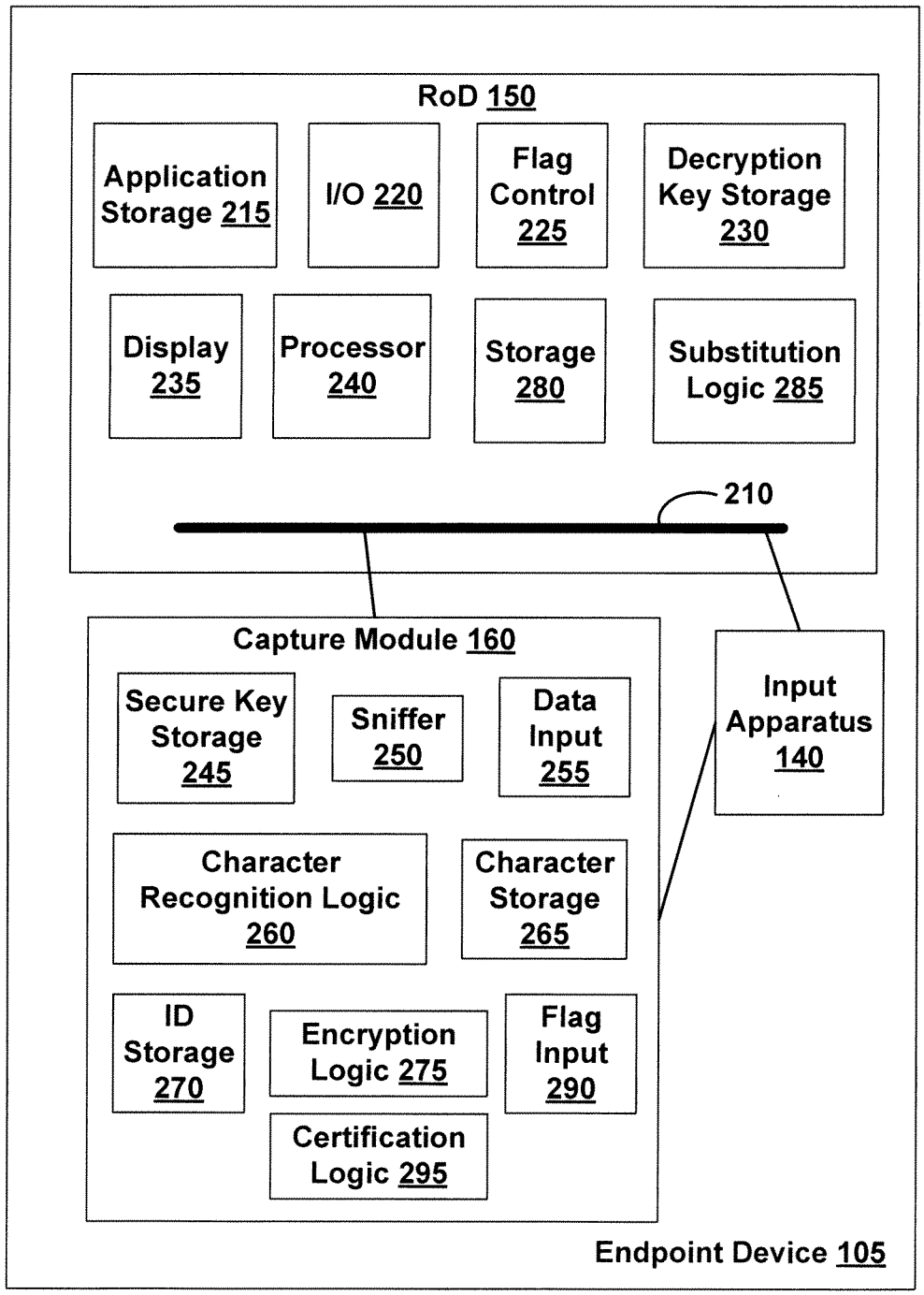
FIG. 2 illustrates an endpoint device, according to various embodiments of the invention.

FIG. 2 illustrates an example of Endpoint Device 105, according to various embodiments of the invention. As illustrated in FIG. 2, RoD 150 includes a Bus 210 and a Processor 240. In typical embodiments, Bus 210 is a parallel or serial data bus and Processor 240 is an electronic microprocessor. Processor 240 is structured or programmed with computing instructions to perform specific functions. Processor 240 is configured to process data and commands received via Bus 210. Bus 210 can be a general purpose system bus, a bus generally used to communicate video data, and/or the like. As used herein the term video data is meant to include static image data as well is video.

RoD 150 further includes an I/O 220 that includes communication logic configured to communicate with external devices, for example, via Network 110. I/O 220 can include a wireless transmitter, an Ethernet connection, a modem, a router, and/or the like. I/O 220 can further include logic configured to place data in data packets, add internet protocol addresses to data packets and/or to encrypt data packets using standard internet protocols. I/O 220 typically includes data buffers configured to facilitate the sending and receiving of data over Network 110.

RoD 150 further includes an Application Storage 215 having non-transient memory configured to store one or more computer applications. For example, Application Storage 215 may include a browser application configured for browsing the internet, a social networking application configured to access a social networking website, a media application configured to receive video or audio streams, an e-mail application configured to access e-mail, an application configured to access a specific website such as that of an auction house or financial institution, and/or the like. Application Storage 215 may include decryption and/or encryption logic. In some embodiments, Application Storage includes applications configured to function as an operating system of Endpoint Device 150, configured to auto-fill text in data entry fields and/or configured to correct spelling. Typically, Processor 240 is configured to execute the one or more applications.

RoD 150 includes a Display 235 configured to present images to a user of Endpoint Device 105. Display 235 can be, for example, a touch screen display of a tablet computer or smart phone. Display 235 may be coupled to a microprocessor and memory (not shown) configured to generate video data for presentation on a screen. In some embodiments Display 235 is closely associated with Input Apparatus 140, for example, in a touch screen. Display 235 is configured to present images generated by applications stored in Application Storage 215. These images can include characters and data entry fields in which a user can enter information for communication to an associated Server 130. For example, an application associated with a specific bank may present to a user a form configured for a user to enter account login information or an application associated with an online store may present a form configured for a user to enter shipping and credit card information. Such forms include data entry fields.

RoD 150 optionally further includes a Flag Control 225 configured to provide binary data values (flags) to control Capture Module 160. Flag Control 225 comprises electrical data inputs configured to perform specific functions. These functions include, for example, reset, change key, change certificate, destroy certificate, destroy key, disable capture, and/or provide notice of a new focus, new-screen, or form submission. The reset flag reinitiates Capture Module 160 to return it to an initial state. The reset flag may be used to recover from errors or as part of resetting all of Endpoint Device 105. One or more change key flag may be used to alternate between different encryption keys or to permanently switch from one key to another. For example, an instance of Endpoint Device 105 may be used for both a user's personal security (social networking and financial etc.) and also be used for accessing secure corporate or government services. These two different levels of security can use different encryption keys (and optionally different TDRs 120). Similarly, one or more change certificate flag may be used to alternate between different certification certificates or to permanently switch from one certificate to another. The destroy key or certificate flags are used to permanently erase an encryption keys and/or certificates, respectively. In some embodiments, a new key can be written to Capture Module 160 only by returning Endpoint Device 105 to an approved vendor or factory (e.g., by disassembling Endpoint Device 105). In some embodiments, Capture Module 160 is permanently disabled by erasing an encryption key. The disable flag is used to temporally disable one or more function of Capture Module 160. Typically, doing so would reduce the functionality of Endpoint Device 105. For example, I/O 220 may be configured in hardware to require that the disable flag be off in order for I/O 200 to send data to and/or receive data from external devices. Optionally, call data is exempt from this restriction. A new focus, new-screen, or submit flag is used to indicate that a change in focus has occurred on Display 235, that the screen on Display 235 has been refreshed, a form has been submitted or that a new form has posted on Display 235.

RoD 150 optionally further includes a Decryption Key Storage 230 configured to store a decryption key configure for decrypting data received from TDR 120. For example, in some embodiments, TDR 120 is configured to encrypt and forward a response from Server 130. In some embodiments RoD 150 is configured to use standard encryption protocols such as SSL or TLS (transport layer security). RoD 150 may be configured to download a public key from TDR 120 for use in a secure conversation with TDR 120. This public key is downloaded into RoD 150 and, thus, does not provide all of the benefits of private keys securely stored in Capture Module 160.

RoD 150 typically further includes a Storage 280 including memory configured to store data associated with applications stored in Application Storage 215. This data can include video data, form data (e.g., metadata that is part of a data entry form), account information, security certificates, internet protocol addresses, and/or the like. For example, Storage 280 may include a fixed IP addresses or domain name associated with TDR 120 and/or various Servers 130. Storage 280 is optionally configured to store a serial number or other unique identifier of Endpoint Device 105. Storage 280 is optionally configured to store unencrypted copies of user input received via Input Apparatus 140.

RoD 150 optionally further includes a Substitution Logic 285 configured to replace unencrypted input data with encrypted and/or certified copies of the input data produced by Capture Module 160. This substation occurs prior to the input data being sent from Endpoint Device 105. Substitution logic may also be configured to substitute encrypted and/or certified metadata for unencrypted metadata, and to substitute an IP address of Server 130 for an IP address or domain name of TDR 120. Substitution Logic 285 is configured to identify data destined for Server 130 and make the substitutions in that data. In some embodiments, substation occurs as the data is being placed in packets for communication by I/O 220.

Capture Module 160 includes a Secure Key Storage 245 configured to store one or more protected encryption keys and/or certificates. In some embodiments, the encryption keys and/or certificates are protected because Capture Module 160 is isolated from RoD 150 such the contents of Secure Key Storage 245 cannot be read from outside of Capture Module 160, e.g., from RoD 150. This can be accomplished by avoiding a read data path from Secure Key Storage 245 to RoD 150 in the circuits of Capture Module 160. In some embodiments, Secure Key Storage 245 is further configured such that the contents of Secure Key Storage 245 cannot be changed once written. In some embodiments Secure Key Storage 245 includes a clock and a key that changes as a function of time. In some embodiments Secure Key Storage 245 includes a value configured to generate a rolling encryption key. In some embodiments Capture Module 160 includes a clock or random number generator configured to create an encryption key based on a seed value stored in Secure Key Storage 245.

Input data is received by Capture Module 160 via Sniffer 250 and/or Data Input 255. Data Input 255 is configured to receive input data directly from Input Apparatus 140, e.g., without the data passing through RoD 150 prior to being received by Capture Module 160. Data Input 255 is typically used in embodiments wherein Capture Module 160 is physically disposed between Input Apparatus 140 and RoD 150 such that all input data from Input Apparatus 140 passes through Capture Module 160 prior to being passed on to RoD 150. This architecture isolates Input Apparatus 140 from RoD 150.

Sniffer 250 is configured to sniff input data from Bus 210. The sniffed input data can include, for example, data communicated from Input Apparatus 140 to Bus 210 and/or from I/O 220 to Bus 210. However the sniffed input data can also include video data destined for presentation on Display 235. This allows Capture Module 160 to capture input data generated by other sources such as spell correction or field auto-completion logic. For example, in embodiments where Application Storage 215 includes applications that alter user's input by correcting spelling or completing a data field, data entered using Input Apparatus 140 may be changed as the data is displayed on Display 235. Specifically, if a user is entering a name or address that has been entered before auto-complete logic may finish the entry before all of the keystrokes have been provided through Input Apparatus 140. Sniffer 250 is optionally configured to capture video data in which the full name or address is displayed. Sniffer 250 also allows capture of input data generated by voice-to-text conversion logic.

Optional Character Recognition Logic 260 is configured to examine video data captured by Sniffer 250 and identify characters entered by a user and/or inserted by spellchecking or auto-complete logic. The identification process may include detection of a field having current focus, observing data entered in that field, and detecting when the current focus changes. Once the current focus changes character recognition for that field can be completed. Thus, text provided by spellchecking, auto-complete or similar logic is captured by Capture Module 160. Character Recognition Logic 260 may also recognize data received from I/O 220, such as form titles, certificates, metadata, etc. Character Recognition Logic 260 may be applied each time focus is changed from one field to another, after a subset of fields are completed, or after an entire form is ready for submission. As discussed elsewhere herein, a flag is optionally used to indicate changes in focus or form submission, to Capture Module 160. In alternative embodiments, Character Recognition Logic 260 is disposed on TDR 120 and the captured video data is transferred to TDR 120 for identification of characters.

In some embodiments, Character Recognition Logic 260 is configured to identify objects at the locations of specific screen coordinates. These locations may be the position of a mouse click or of a touch on a touch screen. For example, if a user is touching a virtual keyboard on a smart phone or tablet computer, Character Recognition Logic 260 is configured to identify the keyboard character at this location. In addition, Character Recognition Logic 260 may be configured to recognize other objects such as a right arrow indicating a next screen, a thumbs-up or thumbs-down symbol, a floppy disk symbol to save, and/or any other computer icon that may be used as part of a graphical user interface.

In these embodiments, Sniffer 250 may sniff, from Bus 210, both the output of Input Apparatus 140 and the video data provided to Display 235. The sniffed data is provided to Character Recognition Logic 260 where correlation between the screen locations received from Input Apparatus 140 and the graphics shown on Display 235 are made. The graphic object that correlates with the location, which may be a character or some other symbol, is identified by Character Recognition Logic 260. The graphic object may itself be treated as the user input, or the graphic object may be converted to an input object and the input object treated as the user input. For example, the graphic object may be converted to a character code, a command, a character combination/sequence, and/or the like. In one exemplary embodiment, a save icon is converted to a Cntl-S character combination, a new icon is converted to a Cntl-N character combination, a paste icon is converted to a Cntl-V character combination, etc. As such, any graphic representation can be converted to meaningful user input.

In some embodiments, Sniffer 250 is configured to sniff data received at I/O 220. For example, Sniffer 250 may sniff form information received from an external web server. Character Recognition Logic 260 may then be configured to recognize certificates, fields and/or metadata within the form and authenticate that the recognized fields and/or metadata were received via I/O 220.

Characters and other input captured by Capture Module 160 are temporally stored in Character Storage 265. Character Storage 265 is optionally also configured to store data associated with forms and form fields, and to store this data in association with the captured input data. For example, a form that includes a data field for an address may have metadata used to tag an entered address. Such tags are used by Server 130 to identify which input data was entered in which field, and optionally if the field was received via I/O 220. The metadata may be captured using Sniffer 250. In alternative embodiments, this metadata is stored in Storage 280 and captured by logic included in Application Storage 215.

Capture Module 160 optionally further includes a device ID Storage 270. ID Storage 270 is configured to store a unique identifier of Capture Module 160. Like Secure Key Storage 245, ID Storage is optionally configured to be inaccessible from outside Capture Module 160. ID Storage may be configured to be unalterable from outside Capture Module 160.

Capture Module 160 optionally further include Encryption Logic 275 configured to encrypt data captured by Capture Module 160 using one or more encryption keys stored in Secure Key Storage 245. The output of Encryption Logic 275 optionally includes an encrypted copy of the unique identifier of Capture Module 160. The output of Encryption Logic optionally includes an encrypted copy of metadata stored in Character Storage 265 and associated with captured characters. Encryption Logic 275 is configured to encrypt data using any of a variety of encryption algorithms known in the art.

Capture Module 160 optionally further includes Certification Logic 295 configured to certify data captured by Capture Module 160, e.g., to digitally sign the captured data. The data is certified using a certificate stored within Capture Module 160. For example, the certificate may be stored in Secure Key Storage 245. The certified data optionally includes a certified copy of the unique identifier of Capture Module 160. The output of Certification Logic 295 optionally includes a certified copy of metadata stored in Character Storage 265 and associated with captured characters.

Capture module 160 includes at least one, and optionally both, of Encryption Logic 275 and Certification Logic 295. In some embodiments, some data is certified and some data is encrypted. For example, user input data may be certified while metadata is encrypted, or vice versa. The unique identifier stored in ID Storage 270 may be encrypted and/or certified.

Capture Module 160 optionally further includes a Flag Input 290. Flag Input 290 is configured to detect the status of Flag Control 225 and adapt the function of Capture Module 160 accordingly. For example, if a destroy key flag is set the current key may be permanently destroyed (e.g., overwritten). If one or more change key flags are set then one of several alternative keys from Secure Key Storage 245 are selected for use by Encryption Logic 275. A destroy certificate flag may be configured to permanently destroy a certificate in a manner similar to destroy key flag. A select certificate flag is optionally used to select between one of several alternative certificates from Secure Key Storage 245 for use by Certification Logic 295. Alternatively, Capture Module 160 may be configured to select from among a plurality of different keys or certificates based on detecting an image on Bus 210; or based on receiving a specific input such as a password or biometric key via Input Apparatus 140.

Figures 3, 4:
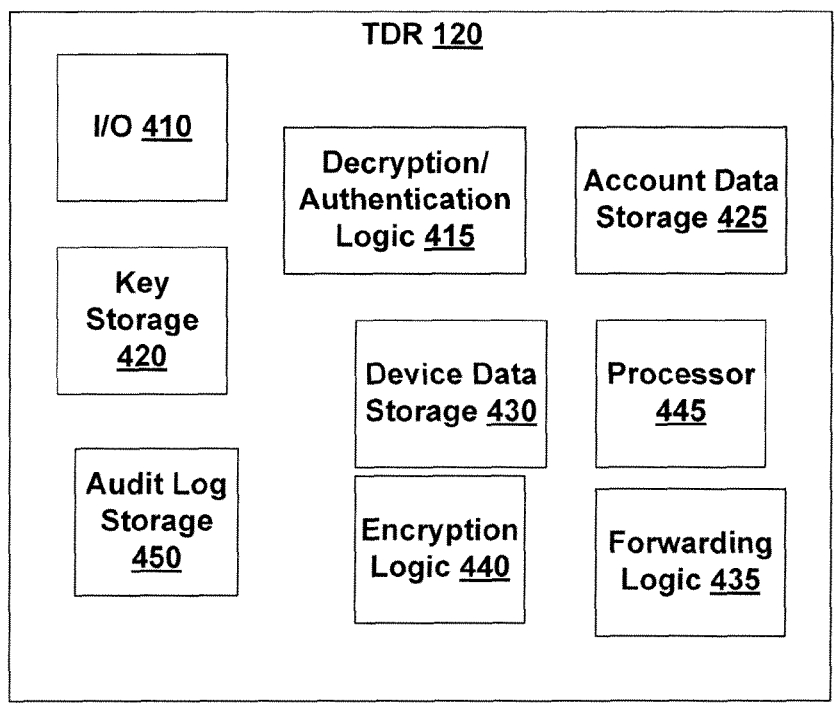
FIG. 3 illustrates and exemplary data input form, according to various embodiments of the invention.
FIG. 4 illustrates a trusted data relay, according to various embodiments of the invention.

FIG. 3 illustrates and exemplary Data Input Form 300, according to various embodiments of the invention. Such a form may be generated by an application stored in Application Storage 215 and displayed on Display 235. Data Input Form 300 includes a plurality of Fields 310 each optionally characterized by a Label 320. Fields 310 are also typically associated with metadata that is not displayed to the user. This metadata is used to tag characters entered in each of Fields 310 such that the data can be identified when received by Server 130. For example the member of Fields 310 configured for entering a street address has associated metadata identifying the characters entered as being an address. Data Input Form 300 may also have metadata that applies to the entire form. For example, Data Input Form 300 may have metadata that includes a check-sum or digital signature. This metadata may be handled by Capture Module 160 in manners similar to those described herein for metadata associated with Fields 310.

In some embodiments, the metadata associated with each field is detected by Sniffer 250 and encrypted by Encryption Logic 275, optionally along with the characters entered in the respective field. In some embodiments, certified and/or encrypted copies of entered characters received from Capture Module 160 are stored in Storage 280 in association with the metadata of the field in which the characters were entered. Fields 310 are optionally filled by auto-completion logic and/or modified by spell checking logic, as discussed elsewhere herein. For example, in some embodiments address data fields relating to billing information are automatically filled by auto-completion logic in response to a user indicating that a billing address is the same as a shipping address (or vice versa).

In some embodiments, characters entered in a field are masked so as not to be displayed. See, for example, the "Credit Card Number:" field in FIG. 3. In these embodiments, Capture Module 160 is optionally configured to sniff the entered characters from Bus 210 as they are communicated from Input Apparatus 140 or to receive the entered characters directly from Input Apparatus 140. The operation of Capture Module 160 is optionally dependent on which Field 310 in Data Input Form 300 has the current focus. For example, if the field is subject to auto-completion then the characters may be captured from video data. If the field is subject to masking, then the characters may be captured as they are communicated from Input Apparatus 140.

In some embodiments Endpoint Device 105 includes an application configured to insert additional metadata into Data Input Form 300. This metadata can server security functions such as establishing a check-sum for the form, can help notify Capture Module 160 when focus changes between Fields 310, can help notify Capture Module 160 when a "next" Button 330 is used to submit a form, can help sniffer by tagging certain data, and/or can help capture Labels 320.

Input data may be sent from Endpoint Device 105 to Server 130 when Data Input Form 300 is completed and submitted, and/or as the focus is moved from one of Fields 310 to another. For example, a value in one of Fields 310 may influence the presence or absence of additional Fields 310 and/or Data Input Form 300 may be configured to send partial data before Data Input Form 300 is entirely completed and/or submit (e.g., using "next" Button 330). Regardless of how the input data is sent from Endpoint Device 105, Substitution Logic 285 is configured to substitute encrypted and/or certified copies of the input data, received from Capture Module 160, for unencrypted/uncertified copies of the input data. As discussed elsewhere herein, the encrypted and/or certified copies may or may not include associated metadata. The metadata, input data and/or identifier of Capture Module 160 can be encrypted and/or certified in any combination. For example, in some embodiments, the metadata and identifier are encrypted while the input data is certified. In some embodiments, the input data and identifier are encrypted while the metadata is certified. In some embodiments, the identifier is encrypted while the metadata and user input are certified. In some embodiments, the metadata is encrypted while the user input is certified, and an identifier is optional. In some embodiments the unique identifier and user input are encrypted while the metadata is certified. All of these data elements (user input, metadata and unique identifier) may be encrypted and/or certified.

Substitution Logic 285 is optionally further configured to substitute an IP address of TDR 120 for the IP address or domain name of Server 130 such that data packets including the encrypted input data are sent to TDR 120 rather than to Server 130. Optionally, the original IP address is retained elsewhere in the data packet such that TDR 120 can easily identify the intended final destination of the data packet. This functionality is optional where the IP address of TDR 120 is in the data packets by default.

The input data, metadata and/or identifier of Capture Module 160 are optionally sent from Endpoint Device 105 using SSL (secure socket layer) or SSH (secure shell) protocols, for example HTTPS communications. These protocols may be implemented by I/O 220 and constitute a second layer of encryption on the input data metadata and identifier. For example, in some embodiments, the identifier and/or metadata are encrypted using both Encryption Logic 275 and SSL, while associated input data (optionally authenticated) is encrypted using just SSL. In some embodiments, the metadata and/or the identifier are encrypted twice while the input data is encrypted using just SSL. In some embodiments, the input data, the unique identifier and/or at least part of the metadata are encrypted using both Encryption Logic 275 and SSL (or SSH). Other combinations of single and double encryption will be apparent based on the teachings herein.

FIG. 4 illustrates TDR 120, according to various embodiments of the invention. TDR 120 is configured to receive the encrypted and/or certified data from Endpoint Device 105. Typically, the encrypted and/or certified data is received via Network 110 by an I/O 410. I/O 410 includes one or more devices configured to communicate via communication networks. These devices are configured to communicate with multiple different Endpoint Devices 105 and, typically, multiple different Servers 130. For example, in some embodiments I/O 410 includes a first router configured to communicate with Endpoint Device 105 and a second router configured to communicate with Server 130.

TDR 120 further comprises Decryption/Authentication Logic 415 and Key Storage 420. Decryption/Authentication Logic 415 is configured to decrypt and/or authenticate data received from Endpoint Device 105 using a decryption key and/or certificate verification information stored in Key Storage 420. Certificate verification information can include, for example, a public key associated with the certificate used, a symmetric key, and/or the like. Optionally a certificate is used to establish a pair of symmetric keys in a communication session between Endpoint Device 105 and TDR 120. Further communications that are part of that communication session may make use of these symmetric keys. As used herein the term "certificate verification information" is used to refer in general to information that can be used to verify a digital signature. The digital signature may or may not have been generated using a private or third party certificate. One example if certificate verification information is a public or private key used for validating a digital signature.

In some embodiments, the appropriate decryption key is identified within Key Storage 420 by identifying the source of the encrypted data, e.g., identifying Endpoint Device 105. This identification can be accomplished in a variety of different ways. In some embodiments, a MAC (Media Access Control) address, unique identifier and/or serial number or is used to look up the appropriate key in Key Storage 420. In some embodiments, the decryption key is identified using the unique identifier or digital signature of Capture Module 160. For example, if the metadata is encrypted by Encryption Logic 275 and the input data and identifier are certified using Certification Logic 295 (and optionally also SSL encrypted), the identifier or the digital signature associated with the certification may be used to look up the decryption key needed to decrypt the metadata.

A Device Data Storage 430 is optionally configured to store the unique identifier, certificate verification information, MAC address, IP address, and/or other identifier of Capture Module 160. The information stored in Device Data Storage 430 optionally includes associations configured for authentication of received input data. For example, Device Data Storage 430 can include associated data records configured to store the certificate verification information, serial number, unique identifier of Capture Module 160 and/or a MAC address of I/O 220. Received input data and/or metadata can be authenticated by confirming that the digital signature, serial number, unique identifier and/or MAC address match. In some embodiments, authentication is also inherent in that only the correct decryption key can be used to successfully decrypt data that was encrypted using Encryption Logic 275.

In addition to looking up the decryption key, any of the above information can be used to look up account information associated with Endpoint Device 105. This account information is stored in an Account Data Storage 425. Account Data Storage 425 is configured to store the account information through, for example, proper data structures. Secure Communication System 100 can provide security by protecting and authenticating Endpoint Device 105, without the use of a user's personal information. This can be an advantage. However, in alternative embodiments, The account information can include registered names of users of Endpoint Device 105, bank account information, credit card information, account status, the identities of Servers 130 for which access is authorized via TDR 120, administrative authority over the account, passwords and login information for accessing user accounts on Servers 130, and/or the like. The inclusion of user identifying information within Account Data Storage 425 is optional. In some embodiments, the stored account information includes a password and login information provided by a manager of Server 130 (e.g., a financial institution). The identity of the account holder associated with the password and login information need only be known by the financial institution. By authenticating Endpoint Device 105 and not necessarily requiring that a user provide the password and login information (to authenticate the user) privacy protection can be greatly enhanced.

The account status stored in Account Data Storage 425 is optionally used to control the functionality of Endpoint Device 105. For example, if Endpoint Device 105 is stolen this fact may be reported and stored in Account Data Storage 425 and as a result access to authorized Servers 130 via TDR 120 can be blocked. This approach can be used to control any function of Endpoint Device 105 that involves network communication including, but not limited to, texting, establishing voice communications, e-mail access, access to specific websites, financial transactions, and/or the like. This control of functionality is reversible by merely changing the account status stored in Account Data Storage 425.

For each Endpoint Device 105 access to one or more Server 130 may be authorized. For example, Endpoint Device 105 may be associated with an eBay.com account, a bank account, an e-mail account, a streaming music account, and a Facebook account. Each of these accounts can be serviced by a different independent instance of Server 130. The authorization to access an account can include providing login information and IP addresses of the Servers 130 to TDR 120 and storing this data in Account Data Storage 425 in association with an identifier of Endpoint Device 105 and/or Capture Module 160. This information is optionally provided by a manager of Server 130. For example, a user may bring a cellular phone, including Capture Module 160, into a bank and asked that the bank authorize access to a bank account via the cellular phone. The bank can obtain an identifier (identifier of Capture Module 160, certificate, etc.) from the phone and then provide TDR 120 with the identifier and authorization information for the phone, the authorization information including login identifier and optionally a password. At TDR 120 the provided information is stored in association with the identifier of the phone. The Server 130 is then optionally set to only allow access to the user's account from TDR 120 when a request includes the authorization information. TDR 120 need not store personal information of the user because the authorization information can be anonymous to anyone but the bank. In some embodiments, different levels of access to the user's account is granted dependent on whether the access is requested from an authorized Endpoint Device 105. Even though, in some embodiments, TDR 120 stores an account password the user may or may not be required to enter an additional optionally different password on Endpoint Device 105 to access the account. Access to some Server 130 may require both that a user provide a correct password and that the password be provided from an Endpoint Device 105 authenticated using the systems and methods described herein.

TDR 120 further includes Forwarding Logic 435 configured to forward decrypted copies, and/or copies that have been certified, of the input and metadata received from Endpoint Device 105. The forwarded data is forward to a correct instance of Server 130, as identified in Account Data Storage 425. In some embodiments, Forwarding Logic 435 is configured to check account status and/or authorization of the Server 130 prior to forwarding. In some embodiments, data (input and metadata) is automatically forwarded but the forwarded data is meaningless unless the proper decryption key or certification was used by Decryption/Authentication Logic 415. I/O 410 is typically used to place the forwarded data in appropriate data packets.

TDR 120 typically further includes Encryption Logic 440 which is configured to encrypt data packets sent from TDR 120 to Server 130. In some embodiments, Encryption Logic 440 is configured to perform encryption according to SSL or SSH protocols. Server 130 may be configured to, for certain user accounts and/or forms, be configured to only accept input data forwarded by TDR 120.

TDR further includes a Processor 445 configured to execute Decryption/Authentication Logic 415 and/or Encryption Logic 435. In some embodiments, Processor 445 is an electronic microprocessor configured for a specific purpose by Decryption/Authentication Logic 415 and/or Encryption Logic 435.

TDR 120 optionally further includes an Audit Log Storage 450 configured to store an audit of data transactions. This audit can include records of transaction, Endpoint Devices 105 from which data was received, Servers 130 to which data was sent, and/or the like.

In some embodiments TDR 120 is configured to receive a response to data forwarded to Server 130. This response may be decrypted using Decryption/Authentication Logic 415 and/or encrypted using Encryption Logic 440 prior to forwarding to Endpoint Device 105. The response may include an additional form configured to receive user input.

Figure 5:
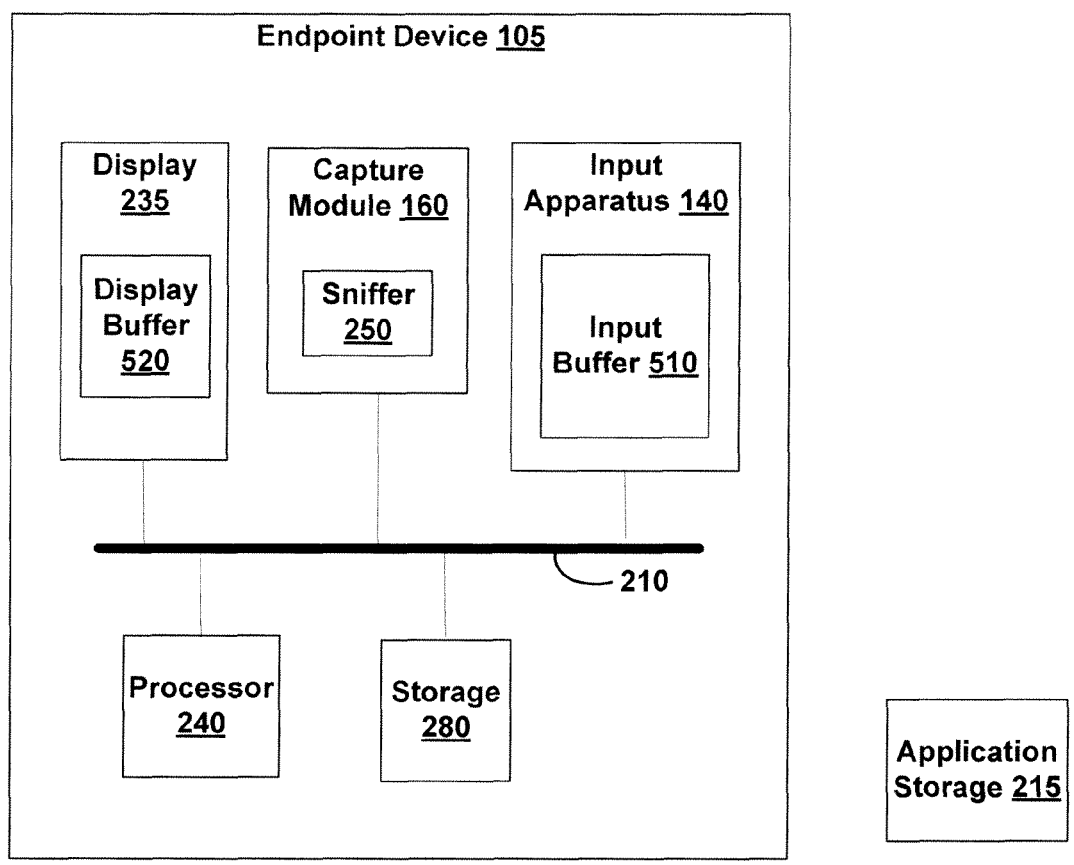
FIG. 5 illustrates further details of a capture module, according to various embodiments of the invention.

FIG. 5 illustrates further details of Capture Module 160. User Input Apparatus 140 and Display 235 include an Input Buffer 510 and Display Buffer 520, respectively. Input Buffer 510 is storage configured to receive and store input from a user of Endpoint Device 105, the inputs being transduced by Input Apparatus 140. For example, in embodiments in which Input Apparatus 140 includes a keyboard, Input Buffer 510 is optionally located within the keyboard and is configured to store digital key codes. Input Buffer 510 is the first place that input data is stored, at which the input data is accessible through Bus 210, after it is transduced within input Apparatus 140. In embodiments including a touch screen Input Buffer 510 may be configured to store one or more touch location. I/O 220 is optionally configured to include a buffer having similar characteristics.

Bus 210 is configured to communicate the input from Input Buffer 510 to storage accessible to Processor 240, e.g., Storage 280. As such, Processor 240 can receive the user input via Input Apparatus 140.

Sniffer 250 is optionally configured to detect the user input in a way that assures that the detected input is not corrupted by logic operating outside of the input apparatus, e.g., by malware. For example, Sniffer 250 may accesses the user input as it is being communicated from a part of input apparatus that cannot be changed by an operating system or other logic executing on Processor 240. Or Sniffer 250 may access the user input before it can be changed by an operating system or other logic executing on Processor 240. In some embodiments, this part of input apparatus is Input Buffer 510. As such, the detection occurs prior to the user input being accessible to or modifiable by Processor 240 and/or other elements outside of User Input Apparatus 140. The input as detected by Sniffer 250 is unalterable by Processor 240 prior to detection. After detection the input is within a protected part of Capture Module 160. Thus, the integrity of the input, through the time it is encrypted or certified, is assured. The encrypted or digitally signed copy of the input that is detected by Sniffer 250 is assured to be a true copy of the input as received from the user. Because the output of Sniffer 250 is in a protected area of Capture Module 160, any malware located on RoD 150 cannot corrupt the input prior to encryption or certification.

Display Buffer 520 is storage configured to receive video data and to provide the video data to a display screen where it may be observed by a user. Display Buffer 520 is the last storage in that can be accessed via Bus 210 before it is presented at the display screen. Typically, between Display Buffer 520 and the display screen the video data is merely prepared (e.g., placed in the right formation and given the correct timing) for display. Sniffer 250 is optionally configured to detect the video data in a way that assures that the detected video data is what is actually presented to the user. For example, Sniffer 250 may be configured to detect all communications via Bus 210 to Display Buffer 520 such that Capture Module 160 can detect a copy of the video data that is assured to be the same as is presented to the user on the display screen. The video data may be detected at a point (in the communication of the video data to the video display) after which the video data is no longer modifiable by Processor 240. The video data may be detected at a point (in the communication of the video data to the video display) at which any change to the video data by an operating system or other logic executing on Processor 240 is detectable by Sniffer 250.

In some embodiments of Endpoint Device 105 do not include a Display Buffer 520. For example, in less sophisticated mobile devices there is no intermediary buffer between an operating system and other logic executed by Processor 240 and the screen of Display 235. In these devices, the operating system may be responsible for continually communicating video data to the screen at a fixed refresh rate (e.g., 60 Hz). In these cases, Sniffer 250 is optionally configured to sniff Bus 210 where the video data is communicated to the screen, for example, between Processor 240 and the screen.

FIG. 6 illustrates methods of transferring secure data, according to various embodiments of the invention. These methods are optionally performed on Endpoint Device 105 and results in encrypted and/or certified data being sent to TDR 120.

In a Display Form Step 610 a form configured for user input is displayed on Display 235 of Endpoint Device 105. Data Input Form 300 is an example of such a form. The displayed form may come from an application running on Endpoint Device 105 or may be part of a webpage displayed in a browser.

In a Detect Form Step 615 the presence of the form on Display 235 is detected by Capture Module 160. This is accomplished by an application providing a notice to (e.g., by setting a flag discussed elsewhere herein) or by Capture Module 160 sniffing data on Bus 210. For example, Capture Module 160 may be configured to detecting of a new display page to Display 235.

In an Identify Field Step 620 one or more data entry fields are identified within the displayed form. The data entry fields are typically configured for entry of characters such as illustrated in FIG. 3. However, in alternative embodiments, data entry fields may include checkboxes, icons, a virtual keyboard, and/or the like. Data entry fields may be identified by their images as displayed on Display 235 and/or by metadata associated with the fields.

In an optional Gather Metadata Step 625 metadata associated with identified data fields is gathered. This metadata is optionally gathered using Sniffer 250. The metadata is stored in Character Storage 265.

In a Sniff Bus Step 630 Bus 210 is sniffed for input data using Sniffer 250. Bus 210 may be sniffed for user input data coming from Input Apparatus 140 and/or for input data displayed on Display 235. In some embodiments, user input is received directly from Input Apparatus 140 via Data Input 255 in Sniff Bus Step 630. Use of Sniffer 250 is optional.

In a Detect Submit Step 635 the submission of a form or subset thereof is detected. This detection may be accomplished using Sniffer 250. Submission of the form means that data entered in the form is submitted for further processing, such as sending to Server 130. Detect Submit Step 635 may occur in response to the change focus flag, new-screen flag, and/or a submit flag discussed elsewhere herein.

In an optional Extract Data Step 640 input data entered in the form is extracted from associated metadata. This step is used, for example, when the input data and metadata are processed differently. Extract Data Step 640 may also include use of Character Recognition Logic 260 to identify input data within images displayed on Display 235. The extracted input data is stored in Character Storage 265.

In an optional Sign Data Step 650 Certification Logic 295 is used to certify, e.g., digitally sign, an identifier of Capture Module 160 stored in ID Storage 270, input data and/or associated metadata. The certification may be accomplished using a digital certificate stored in Secure Key Storage 245.

In an optional Encrypt Step 655 Encryption Logic 275 is used to encrypt an identifier of Capture Module 160 stored in ID Storage 270, input data and/or associated metadata. The input data and associated metadata are those obtained and optionally the extracted in proceeding steps above. The methods illustrated by FIG. 6 include at least one of Sign Data Step 650 and Encrypt Step 655. As described elsewhere herein, the input data and associated metadata are optionally processed differently.

In an Insert Data Step 660 the data certified in Sign Data Step 650 and/or Encrypted in Encrypt Step 655 are inserted into data packets addressed to TDR 120. The insertion optionally includes replacing non-certified and/or non-encrypted copies of the data. The insertion optionally further includes adding an address, e.g., IP address, of TDR 120 to the data packets. This address may be obtained from within Capture Module 160, RoD 150, or a location external to Endpoint Device 105.

In a Send Data Step 665 the data packets including the certified and/or encrypted data are sent to TDR 120. Send Data Step 665 optionally includes encrypting the data packets using standard protocols such as secure socket layer (SSL) encryption. The data packets may be sent to a fixed IP address, domain name or fixed location on a network. An address of the destination is optionally stored in Storage 280.

FIG. 7 illustrates methods of receiving and forwarding secure data, according to various embodiments of the invention. The methods illustrated by FIG. 7 are optionally performed using TDR 120. These methods may follow the methods illustrated by FIG. 6.

In a Receive Packet Step 710 a data packet is received from one of a plurality of Endpoint Devices 105. This data packet is typically received via Network 110 and may be one of several related data packets received.

In an optional Decrypt Packet Step 715 the received data packet is decrypted using standard protocols such as secure socket layer decryption. In an Identify Source Step 720 the Endpoint Device 105 from which the data packet was received is identified. This may be accomplished using a MAC address and/or other unique identifier of the Endpoint Device 105, using a unique identifier of Capture Module 160, and/or using any of the other identifiers discussed herein.

In an optional Direct Packet Step 725 the received data packet is sent to a server configured to process data packets received from the Endpoint Device 105 identified in Identify Source Step 720. For example, TDR 120 may include a plurality of distributed servers, each configured to process data from a different set of Endpoint Devices 105.

In a Retrieve Key Step 730 an identifier of Endpoint Device 105 is used to retrieve a decryption key from Key Storage 420. Typically, the identifier used in Retrieve Key Step 730 is the same identifier used in Identify Source Step 720. Retrieve Key Step 730 optionally includes retrieving certificate verification information from Key Storage 420 in addition to or as an alternate to retrieving a decryption key.

In a Decrypt/Authenticate Data Step 735 the data packet received in Receive Packet Step 710 is decrypted and/or authenticated using the information retrieved from Key Storage 420 in Retrieve Key Step 730. This may occur in various combinations. For example, metadata may be decrypted while input data is authenticated, or vice versa. In some embodiments an identifier of Capture Module 160 is decrypted in Decrypt/Authenticate Data Step 735 and is then used in a repeat of Retrieve Key Step 730 to retrieve certificate verification information from Key Storage 420. The certificate confirmation data is then used to authenticate other information received in the data packet (or associated data packets).

In an optional Re-Encrypt Data Step 740 the data decrypted and/or authenticated in Decrypt/Authenticate Data Step 735 is re-encrypted using Encryption Logic 440. This encryption may be accomplished using SSL protocols, private and/or public keys.

In a Forward Step 750 the data decrypted and/or authenticated in Decrypt/Authenticate Data Step 735, and re-encrypted using Encryption Logic 440, is forwarded to an instance of Server 130. Forward Step 750 optionally includes retrieving an address of the instance of Server 130 from Account Data Storage 425. Forward Step 750 further optionally includes checking an account status stored in Account Data Storage 425 and/or checking that the Endpoint Device 105 from which the data was received is authorized to access the account or Server 130. In some embodiments, Forward Step 750 includes retrieving a login identifier and/or password from Account Data Storage 425 and adding this information to the forwarded data. In some embodiments, Forward Step 750 is not performed unless the received data is successfully authenticated and/or decrypted via one of the approaches taught herein.

In an optional Receive Response Step 755 a response to the forwarded data is received from the instance of Server 130. This data is optionally encrypted in an Encrypt Step 760. This encryption may be accomplished using SSL protocols, private and/or public keys. The resulting encrypted data is sent to Endpoint Device 105 in an optional Forward Step 765.

Several embodiments are specifically illustrated and/or described herein. However, it will be appreciated that modifications and variations are covered by the above teachings and within the scope of the appended claims without departing from the spirit and intended scope thereof. For example while input including characters are discussed as examples, embodiments of the invention are applicable to non-character input data such as click locations, clicking of a checkbox, GPS data, voice or video data, biometric data and/or the like. For example, in some embodiments the systems and methods disclosed herein are used to protect the initial handshaking routines that are involved is establishing a voice or video call. In some embodiments, cookie data is included in the packets sent from Endpoint Device 105 to TDR 120 and forwarded to Server 130. The cookie data may or may not be encrypted by Capture Module 160. While some encryption and digital signing techniques are discussed herein, one or ordinary skill in the art will understand that based on the teachings here other encryption and digital signing techniques may be used. These may involve any combination of public and private keys, public and private certificates, session keys, symmetric keys, etc.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise non-transient volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software becomes a special purpose computing system for performing those particular functions. Data that is manipulated by a special purpose computing system while performing those particular functions is at least electronically saved in buffers of the computing system, physically changing the special purpose computing system from one state to the next with each change to the stored data.

What is claimed is:

1. A computing system comprising:
an input apparatus configured to receive an input from a user;
a display configured to display the input from the user;
a bus configured to communicate the input to the display;
a processing unit configured to process data and commands received via the bus;
an input capture module isolated from a less secure part of the computing system, the isolation configured to prevent corruption of the input capture module by computing instructions received from outside of the input capture module, the input capture module comprising:
storage configured to store an encryption key or certificate,
a sniffer configured to sniff the bus for input data resulting from the input from the user, and
logic configured to encrypt or certify the input data, the encryption or certification occurring within the input capture module; and
communication logic configured to communicate an output of the input capture module to a communication network.

2. The system of claim 1, wherein the input apparatus includes a touch screen.

3. The system of claim 1, wherein the storage includes memory configured to be written to no more than once.

4. The system of claim 1, wherein the storage is configured to store the encryption key or certificate such that the encryption key or certificate cannot be read from outside the input capture module.

5. The system of claim 1, wherein the storage is configured to store the encryption key or certificate such that the encryption key or certificate cannot be altered from outside the input capture module.

6. The system of claim 1, wherein the storage is configured to store the encryption key.

7. The system of claim 1, wherein the storage is configured to store the certificate.

8. The system of claim 1, wherein the input capture module is isolated from the less secure part of the computing system by limiting external control of the secure input module to setting of one or more flags.

9. The system of claim 8, wherein at least one of the one or more flags is an encryption key or certificate selection flag.

10. The system of claim 8, wherein one of the one or more flags is a reset flag configured to cause resetting of the input capture module.

11. The system of claim 8, wherein one of the one or more flags is a change focus flag, a new-screen flag or a submit flag.

12. The system of claim 8, wherein one of the one or more flags is a disable flag configured to temporally disable a function of the input capture module.

13. The system of claim 1, wherein the output of the input capture module includes a unique identifier configured to confirm that the output was generated within the input capture module.

14. The system of claim 1, wherein the identifier is encrypted as included in the communicated output of the input capture module.

15. The system of claim 1, wherein the sniffer is configured to sniff input data received from the input apparatus before the input data can be changed by the processing unit.

16. The system of claim 1, wherein the storage is configured to store a plurality of encryption keys, the plurality of encryption keys being individually selectable from outside the input capture module.

17. The system of claim 1, wherein the storage is configured to store a plurality of certificates, the plurality of certificates being individually selectable from outside the input capture module.

18. The system of claim 1, wherein the input capture module further comprises character recognition logic configured to identify characters within the input data resulting from the input from the user.

19. The system of claim 1, wherein the input data resulting from the input from the user includes video data communicated to the display via the bus.

20. The system of claim 19, wherein the sniffer is configured to sniff the video data such that the sniffed video data is assured to be the same video data as is presented on the display.

21. The system of claim 1, wherein the input capture module is configured to recognize characters indicated using mouse clicks or a touch pad.

22. The system of claim 1, wherein the input capture module is configured to recognize characters generated by autocomplete logic.

23. The system of claim 1, wherein the input capture module is configured to recognize characters generated by voice-to-text logic.

24. The system of claim 1, wherein the input capture module is configured to recognize characters generated by spell checking logic.

25. The system of claim 1, wherein the key storage is configured to store a plurality of encryption keys, the plurality of encryption keys being automatically selectable by detecting an image on the bus.

26. The system of claim 1, further comprising substitution logic configured to replace contents of a data packet generated within the less secure part of the computing system with the output of the logic.

27. The system of claim 1, wherein the input capture module is isolated from the less secure part of the system by the physical architecture of the computing system.

* * * * *